(12) United States Patent
Shi et al.

(10) Patent No.: US 9,891,451 B2
(45) Date of Patent: Feb. 13, 2018

(54) RIB-TYPE WAVEGUIDE SILICON MODULATORS AND OPTICAL DEVICES

(71) Applicant: SiFotonics Technologies Co., Ltd., Grand Cayman (KY)

(72) Inventors: Tuo Shi, Beijing (CN); Tzung-I Su, Zhongli (TW); Yongbo Shao, Beijing (CN); Dong Pan, Andover, MA (US)

(73) Assignee: SIFOTONICS TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 15/238,688

(22) Filed: Aug. 16, 2016

(65) Prior Publication Data

US 2016/0357036 A1     Dec. 8, 2016

Related U.S. Application Data

(63) Continuation-in-part of application No. 14/788,746, filed on Jun. 30, 2015, now Pat. No. 9,429,776.

(60) Provisional application No. 61/998,504, filed on Jun. 30, 2014.

(51) Int. Cl.
| | |
|---|---|
| *G02F 1/035* | (2006.01) |
| *G02F 1/025* | (2006.01) |
| *G02B 6/28* | (2006.01) |
| *G02F 1/225* | (2006.01) |
| *G02F 1/015* | (2006.01) |
| *G02F 1/21* | (2006.01) |

(52) U.S. Cl.
CPC ........... *G02F 1/025* (2013.01); *G02B 6/2813* (2013.01); *G02F 1/2257* (2013.01); *G02F 2001/0152* (2013.01); *G02F 2001/212* (2013.01); *G02F 2201/063* (2013.01)

(58) Field of Classification Search
CPC .... G02F 2201/063; G02B 2006/12142; G02B 2006/12097
See application file for complete search history.

(56) References Cited

U.S. PATENT DOCUMENTS

| | | | |
|---|---|---|---|
| 2013/0028557 A1* | 1/2013 | Lee | G02B 6/26 385/28 |
| 2014/0233878 A1* | 8/2014 | Goi | G02B 6/122 385/3 |

* cited by examiner

*Primary Examiner* — Ellen Kim
(74) *Attorney, Agent, or Firm* — Han IP Corporation; Andy M. Han

(57) ABSTRACT

A ring optical modulator includes a SOI substrate, including at least first and second top silicon layers, and a silicon-based ring resonator formed on the SOI substrate. The silicon-based ring resonator includes first and second top silicon layers, a thin dielectric gate layer disposed between the top silicon layers, first and second electric contacts, and first rib-type waveguide and ring-shape rib-type waveguide formed on the second top silicon layer. The thin dielectric layer includes a first side in contact with the first top silicon layer and a second side in contact with the second top silicon layer. With electric signals applied on the electric contacts, free carriers accumulate, deplete or invert within the top silicon layers on the first and second sides of the thin dielectric gate layer beneath the ring-shape rib-type waveguide, simultaneously, and a refractive index of the ring-shape rib-type waveguide confining optical fields is modulated.

16 Claims, 13 Drawing Sheets

RIB-TYPE WAVEGUIDE SILICON MODULATORS AND OPTICAL DEVICES

CROSS-REFERENCE TO RELATED PATENT APPLICATION(S)

The present disclosure is a Continuation-in-Part (CIP) of U.S. patent application Ser. No. 14/788,746, filed on Jun. 30, 2015, which is a non-provisional application claiming the priority benefit of U.S. Patent Application No. 61/998,504, filed on Jun. 30, 2014. The aforementioned applications are herein incorporated by reference in their entirety.

TECHNICAL FIELD

The present disclosure is related to electro-optic devices. More particularly, the present disclosure is related to silicon-based rib-waveguide modulators and optical devices thereof.

BACKGROUND

In recent years, silicon modulators have attracted a lot of attention, due to their characteristics of easy integration, low power consumption, CMOS-process compatibility, and relatively smaller size. These benefits are keys to reducing the footprint and power consumption of optical transceiver modules for long-haul and metro telecommunication. In one approach, a MOS-structure based silicon modulator may achieve high speed modulation, benefiting from electro-optic effect. The active region may be 500-µm in length, rather small compared with traditional lithium-niobate (LiNbO3) Mach-Zehnder modulator. Meanwhile, the driving peak-to-peak voltage may be as small as 1.2V, exhibiting 9 dB extinction ratio.

However, in CMOS process, the poly-silicon layer is utilized as the gate layer of the optical waveguide, where high propagation loss is induced due to the absorption and scattering losses of grain boundaries, which results in a high insertion loss. Meanwhile, 100 G long-haul coherent transmission has very high requirement of modulator extinction ratio performance, thus the length of MOS-structure silicon modulator has to be extended to achieve the high extinction ratio. This is because higher driving voltage is not a feasible method given the risk of oxide breakdown at higher voltage.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

The present disclosure provides a novel rib-type waveguide MOS-structure ring modulator. Embodiments of the present disclosure reduce optic loss, increase modulation efficiency, and allow length extension for the modulator to obtain higher extinction ratio with very low driving voltage swing.

In one aspect, a ring optical modulator may include a silicon-on-insulator (SOI) substrate and a silicon-based ring resonator formed on the SOI substrate. The SOI substrate may include multiple top silicon layers having at least a first top silicon layer and a second top silicon layer. The silicon-based ring resonator may include a first top silicon layer, a second top silicon layer, a thin dielectric gate layer disposed between the first top silicon layer and the second top silicon layer, a first electric contact formed on the first top silicon layer, a second electric contact formed on the second top silicon layer, a first rib-type waveguide formed on the second top silicon layer, and a ring-shape rib-type waveguide formed on the second top silicon layer. The thin dielectric layer may include a first side in contact with the first top silicon layer and a second side in contact with the second top silicon layer. When one or more electric signals are applied on the first and second electric contacts, free carriers may accumulate, deplete or invert within the first and second top silicon layers on the first and second sides of the thin dielectric gate layer beneath the ring-shape rib-type waveguide, simultaneously, and a refractive index of the ring-shape rib-type waveguide confining optical fields may be modulated.

In some embodiments, the ring optical modulator may also include a second rib-type waveguide formed on the second top silicon layer.

In some embodiments, at least one of the first top silicon layer and the second top silicon layer may be composed of single crystal silicon.

In some embodiments, the ring optical modulator may also include a first doped region formed on the first top silicon layer, with the first doped region including dopants of a first type.

In some embodiments, the ring optical modulator may further include a second doped region formed within the first doped region on the first top silicon layer. The second doped region may include dopants of the first type with a concentration of dopants higher than that of the first doped region.

In some embodiments, the first rib-type waveguide may be composed of intrinsic silicon.

In some embodiments, the second rib-type waveguide may be composed of intrinsic silicon.

In some embodiments, the ring optical modulator may further include a second doped region that includes dopants of a first type. A portion of the second doped region may be beneath the first rib-type waveguide and the second rib-type waveguide.

In some embodiments, the ring optical modulator may further include a third doped region formed in the ring-shape rib-type waveguide, with the third doped region including dopants of a second type.

In some embodiments, the first doped region may overlap with the ring-shape rib-type waveguide and the third doped region to form a metal-oxide-semiconductor (MOS) type junction.

In some embodiments, the ring optical modulator may further include a fourth doped region formed on a center slab region within the third doped region of the ring-shape rib-type waveguide. The fourth doped region may have a concentration of dopants higher than that of the third doped region.

In some embodiments, the first electric contact may be formed on the second doped region on the first top silicon layer.

In some embodiments, the second electric contact may be formed on the fourth doped region on the second top silicon layer.

In some embodiments, the first rib-type waveguide may be disposed next to the ring-shape rib-type waveguide with a small gap therebetween, thereby forming a directional coupler.

In some embodiments, the second rib-type waveguide may be disposed next to the ring-shape rib-type waveguide with a small gap therebetween, thereby forming a directional coupler.

In some embodiments, the ring-shape rib-type waveguide may include a series of cascaded ring-shape rib-type waveguides, thereby forming a cascaded resonance cavity.

In another aspect, an optical coupling device may include an input section, a directional coupling section, and an output section. The input section may include a first input rib-type waveguide, a second input rib-type waveguide, and a continuously decreasing gap between the first input rib-type waveguide and the second input rib-type waveguide. The directional coupling section may include a first rib-type coupling waveguide connected to an output of the first input rib-type waveguide, a second rib-type coupling waveguide connected to an output of the second input rib-type waveguide, and a small gap between the first rib-type coupling waveguide and the second rib-type coupling waveguide. The output section may include a first output rib-type waveguide connected to the first rib-type coupling waveguide, a second output rib-type waveguide connected to the second rib-type coupling waveguide, and a continuously increasing gap between the first output rib-type waveguide and the second output rib-type waveguide. A slab of each of the first input rib-type waveguide, the second input rib-type waveguide, the first rib-type coupling waveguide, the second rib-type coupling waveguide, the first output rib-type waveguide and the second output rib-type waveguide may be formed on a first top silicon layer. A rib of each of the first input rib-type waveguide, the second input rib-type waveguide, the first rib-type coupling waveguide, the second rib-type coupling waveguide, the first output rib-type waveguide and the second output rib-type waveguide may be formed on a second top silicon layer. A thin dielectric gate layer may be disposed between the first top silicon layer and the second top silicon layer.

In another aspect, a multimode interference (MMI) coupler apparatus may include an input section, comprising at least one input rib-type waveguide, a rib-type multimode interference waveguide section, and an output section, comprising at least one output rib-type waveguide. A slab of each of the at least one input rib-type waveguide, the rib-type multimode interference waveguide, and the at least one output rib-type waveguide may be formed on a first top silicon layer. A rib of each of the at least one input rib-type waveguide, the rib-type multimode interference waveguide, and the at least one output rib-type waveguide may be formed on a second top silicon layer. A thin dielectric gate layer may be disposed between the first top silicon layer and the second top silicon layer.

In some embodiments, the at least one input rib-type waveguide may include a taper waveguide with an increasing width, and the at least one output rib-type waveguide may include a taper waveguide with a decreasing width.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure. The drawings may not necessarily be in scale so as to better present certain features of the illustrated subject matter.

DETAILED DESCRIPTION OF THE PREFERRED EMBODIMENTS

Figure 1:
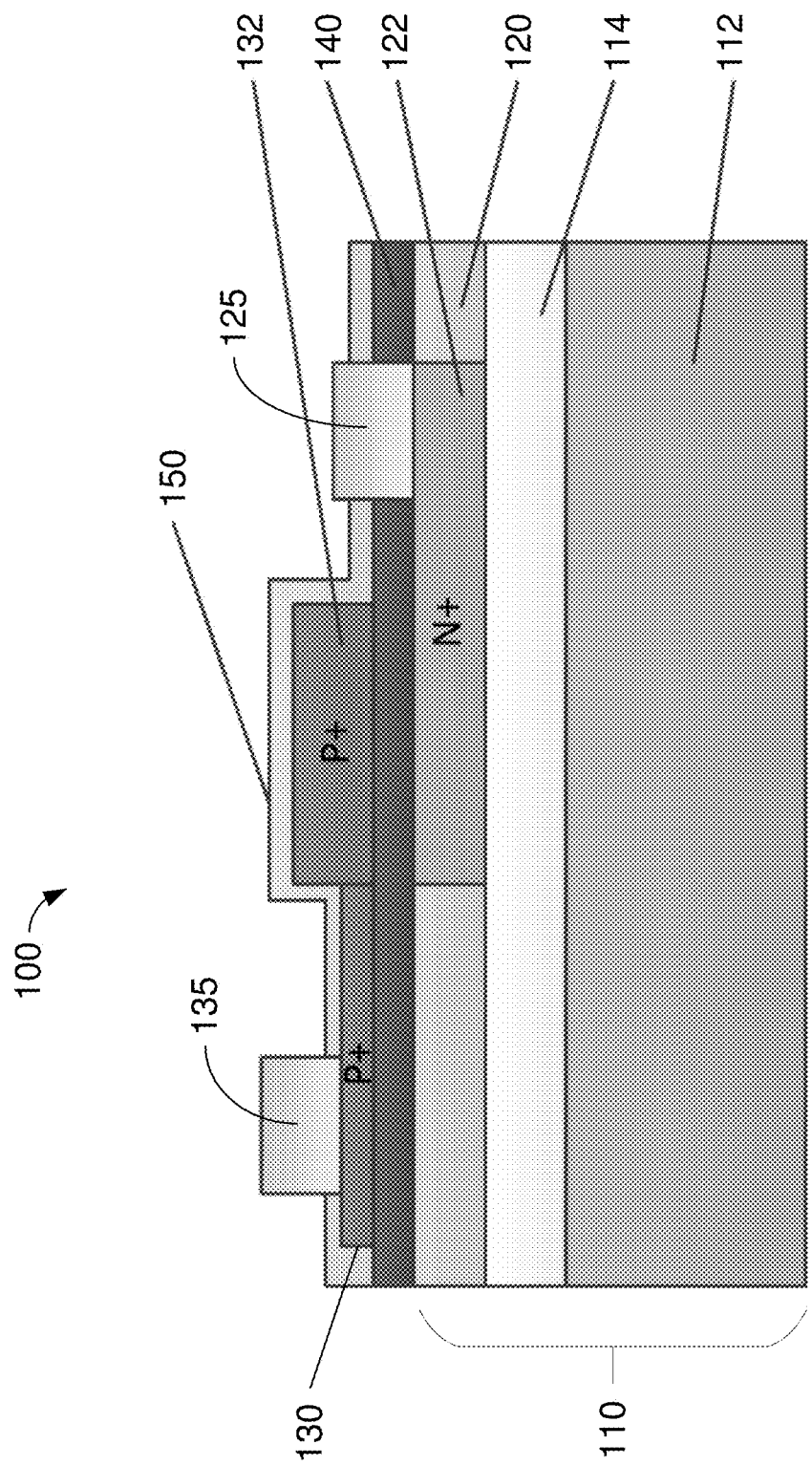
FIG. 1 is a cross-sectional view of an electro-optic structure of a silicon-based rib-waveguide modulator in accordance with an embodiment of the present disclosure.

FIG. 1 illustrates a cross-sectional view of an electro-optic structure of a silicon-based rib-waveguide modulator 100 in accordance with an embodiment of the present disclosure. Silicon-based rib-waveguide modulator 100 may be implemented in an electro-optic device.

Referring to FIG. 1, silicon-based rib-waveguide modulator 100 may include a first top silicon layer 120, a second top silicon layer 130, and a thin dielectric gate layer 140. The first top silicon layer 120 may include a first doped region 122 that is at least partially doped with dopants of a first conducting type, e.g., N type dopants. For example, the first doped region 122 may be an N+ region. The second top silicon layer 130 may include a second doped region 132 that is at least partially doped with dopants of a second conducting type, e.g., P type dopants. For example, the second doped region 132 may be a P+ region. The second doped region 132 of the second top silicon layer 130 may be at least in part directly over the first doped region 122 of the first top silicon layer 120. The thin dielectric gate layer 140 may be disposed between the first top silicon layer 120 and the second top silicon layer 130. The thin dielectric gate layer 140 may include a first side (e.g., the top side shown in FIG. 1) in contact with the first top silicon layer 120 and a second side (e.g., the bottom side shown in FIG. 1) in contact with the second top silicon layer 130. Silicon-based rib-waveguide modulator 100 may also include a rib waveguide (not shown) formed on the second top silicon layer 130, a first electric contact 125 formed on the first top silicon layer 120, and a second electric contact 135 formed on the second top silicon layer 130. Silicon-based rib-waveguide modulator 100 may further include a passivation layer 150 formed on the second top silicon layer 130 and the second doped region 132.

In operation, when electric signals are applied on the first and second electric contacts 125 and 135, free carriers in the silicon-based rib-waveguide modulator 100 may accumulate, deplete, or invert within the first and second top silicon layers 120 and 130 on the first and second sides of the thin dielectric gate layer 140 simultaneously. Moreover, a refractive index of the rib waveguide confining optical field may be modulated. That is, the phase of a guiding light may be modulated.

In some embodiments, at least one of the first top silicon layer 120 and the second top silicon layer 130 may be made of single-crystal silicon.

Figure 2:
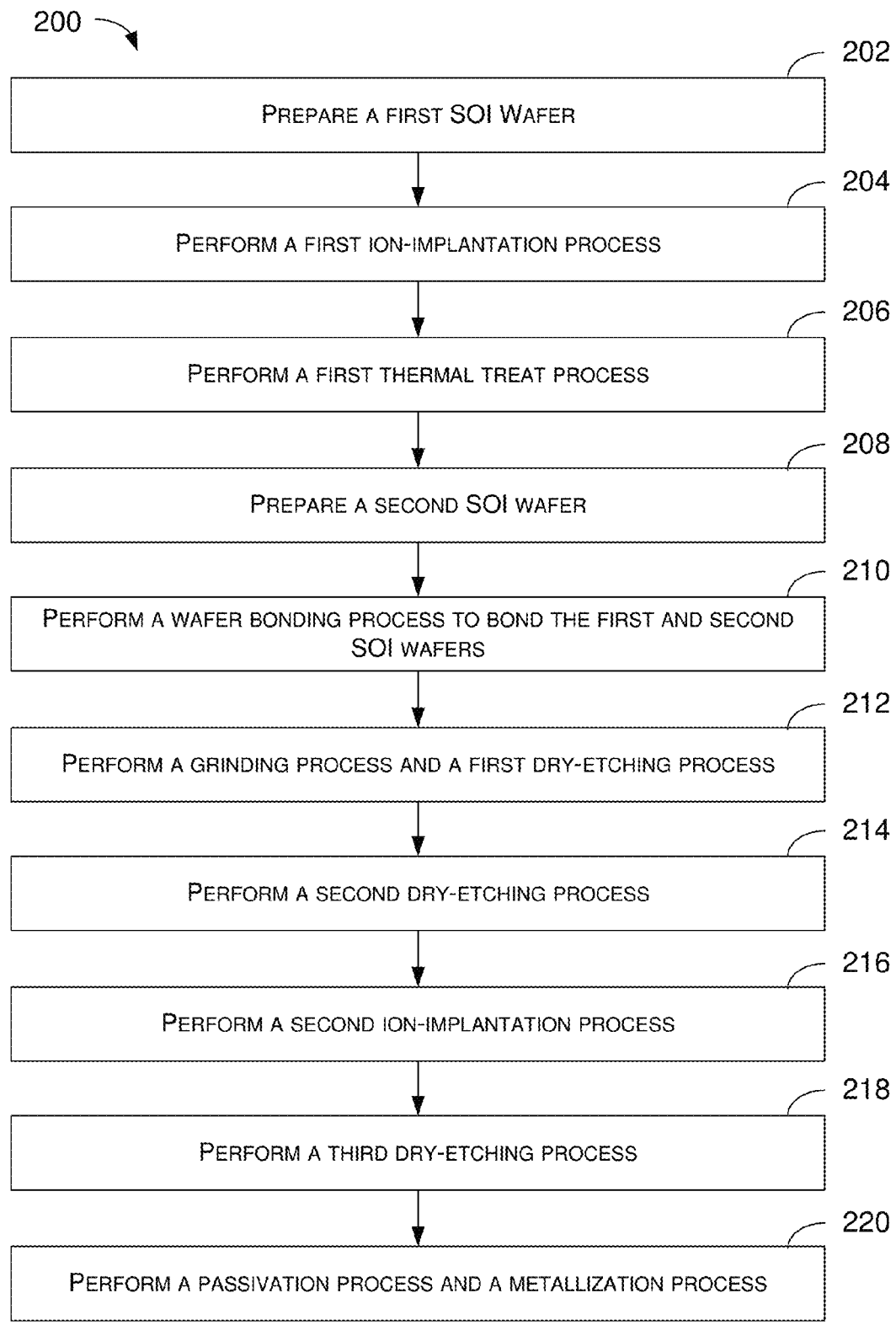
FIG. 2 is a flowchart of a fabrication process of an electro-optic device in accordance with an embodiment of the present disclosure.

FIG. 2 is a flowchart of a process 200 of fabrication of an electro-optic device of FIG. 1 in accordance with an embodiment of the present disclosure.

Process 200 may be utilized to fabricate the silicon-based rib-waveguide modulator 100 of an electro-optic device of FIG. 1. Process 200 may include a number of operations including, but not limited to, those shown in FIG. 2. Although operations 202-220 in FIG. 2 are shown in a particular order, in various embodiments some of the operations 202-220 may be implemented in orders different from that shown in FIG. 2. Moreover, some of the operations 202-220 may be implemented in parallel and not necessarily in series as shown in FIG. 2. For illustrative purpose, the following description of process 200 refers to silicon-based rib-waveguide modulator 100 of FIG. 1.

At 202, process 200 may involve preparing a first silicon-on-insulator (SOI) wafer 110 that includes a first silicon substrate 112, a first buried oxide (BOX) layer 114, and a first top silicon layer 120 which is formed over the first BOX layer 114.

At 204, process 200 may involve performing a first ion-implantation process to form a first doped region 122 in the first top silicon layer 120. The first doped region may be at least partially doped with dopants of a first conducting type, e.g., N type dopants.

At 206, process 200 may involve performing a first thermal treat process to form a first thin thermal oxidized dielectric layer 140 over the first top silicon layer 120.

At 208, process 200 may involve preparing a second SOI wafer (not shown) that includes a second silicon substrate (not shown), a second BOX layer (not shown), and a second top silicon layer 130 which is formed over the second BOX layer.

At 210, process 200 may involve performing a wafer bonding process to combine the first SOI wafer 110 and the second SOI wafer, with the second top silicon layer 130 bonded face-to-face to the thin dielectric layer 140.

At 212, process 200 may involve performing a grinding process and a first dry-etching process to remove the second substrate layer of the second SOI wafer, using the second BOX layer as a stop layer for the first dry-etching process.

At 214, process 200 may involve performing a second dry-etching process to remove the second BOX layer, using the second top silicon layer 130 as a stop layer for the second dry-etching process.

At 216, process 200 may involve performing a second ion-implantation process to form a second doped region 132 in the second top silicon layer 130. The second doped region 132 may be at least partially doped with dopants of a second conducting type, e.g., P type dopants.

At 218, process 200 may involve performing a third dry-etching process to form a rib waveguide (not shown) on the second top silicon layer 130.

At 220, process 200 may involve performing a passivation process and a metallization process to form a first electric contact 125 on the first top silicon layer 120 and a second electric contact 135 formed on the second top silicon layer 130.

In at least some embodiments, process 200 may also involve performing a second thermal treat process on the second SOI wafer to form a second thin dielectric layer over the second top silicon layer. Process 200 may further involve performing a wafer bonding process to combine the first SOI wafer and the second SOI wafer, with the second thin dielectric layer bonded face-to-face to the first thin dielectric layer.

Figure 3:
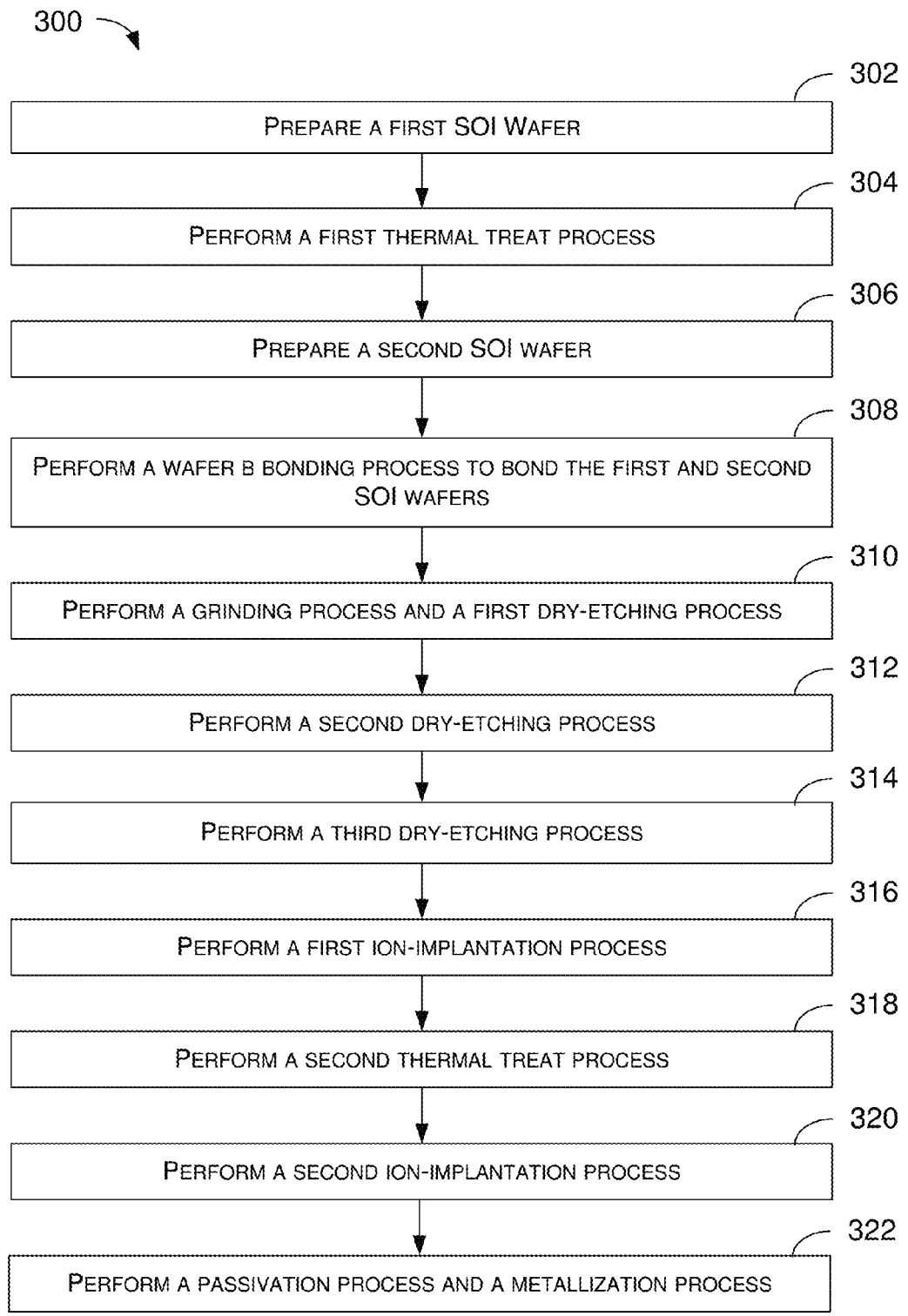
FIG. 3 is a flowchart of a fabrication process of an electro-optic device in accordance with another embodiment of the present disclosure.

FIG. 3 is a flowchart of a process 300 of fabrication of an electro-optic device of FIG. 1 in accordance with another embodiment of the present disclosure.

Process 300 may be utilized to fabricate the silicon-based rib-waveguide modulator 100 of an electro-optic device of FIG. 1. Process 300 may include a number of operations including, but not limited to, those shown in FIG. 3. Although operations 302-322 in FIG. 3 are shown in a particular order, in various embodiments some of the operations 302-322 may be implemented in orders different from that shown in FIG. 3. Moreover, some of the operations 302-322 may be implemented in parallel and not necessarily in series as shown in FIG. 3. For illustrative purpose, the following description of process 300 refers to silicon-based rib-waveguide modulator 100 of FIG. 1.

At 302, process 300 may involve preparing a first SOI wafer 110 that includes a first silicon substrate 112, a first BOX layer 114, and a first top silicon layer 120 which is formed over the first BOX layer 114.

At 304, process 300 may involve performing a first thermal treat process to form a first thin thermal oxidized dielectric layer 140 over the first top silicon layer 120.

At 306, process 300 may involve preparing a second SOI wafer (not shown) that includes a second silicon substrate (not shown), a second BOX layer (not shown), and a second top silicon layer 130 which is formed over the second BOX layer.

At 308, process 300 may involve performing a wafer bonding process to combine the first SOI wafer 110 and the second SOI wafer, with the second top silicon layer 130 bonded face-to-face to the thin dielectric layer 140.

At 310, process 300 may involve performing a grinding process and a first dry-etching process to remove the second silicon substrate of the second SOI wafer, using the second BOX layer as a stop layer for the first dry-etching process.

At 312, process 300 may involve performing a second dry-etching process to remove the second BOX layer, using the second top silicon layer 130 as a stop layer for the second dry-etching process.

At 314, process 300 may involve performing a third dry-etching process to form a rib waveguide (not shown) on the second top silicon layer 130. A window region (not shown) of the second top silicon layer 130 may be etched down to the thin dielectric layer 140.

At 316, process 300 may involve performing a first ion-implantation process to implant, through the window region, impurities or dopants of a first type, e.g., N type, into the first top silicon layer 120.

At 318, process 300 may involve performing a third thermal treat process to cause lateral diffusion of the impurities of the first type to form a first conducting-type region or a first doped region 122 in the first top silicon layer 120.

At 320, process 300 may involve performing a second ion-implantation process to form a second conducting-type region or a second doped region 132 in the second top silicon layer 130 with impurities or dopants of a second type, e.g., P type.

At 322, process 300 may involve performing a passivation process and a metallization process to form a first electric contact 125 on the first top silicon layer 120 and a second electric contact 135 formed on the second top silicon layer 130.

In at least some embodiments, process 300 may also involve performing a second thermal treat process on the second SOI wafer to form a second thin dielectric layer over the second top silicon layer. Process 300 may further involve performing a wafer bonding process to combine the first SOI wafer and the second SOI wafer, with the second thin dielectric layer bonded face-to-face to the first thin dielectric layer.

Figure 4:
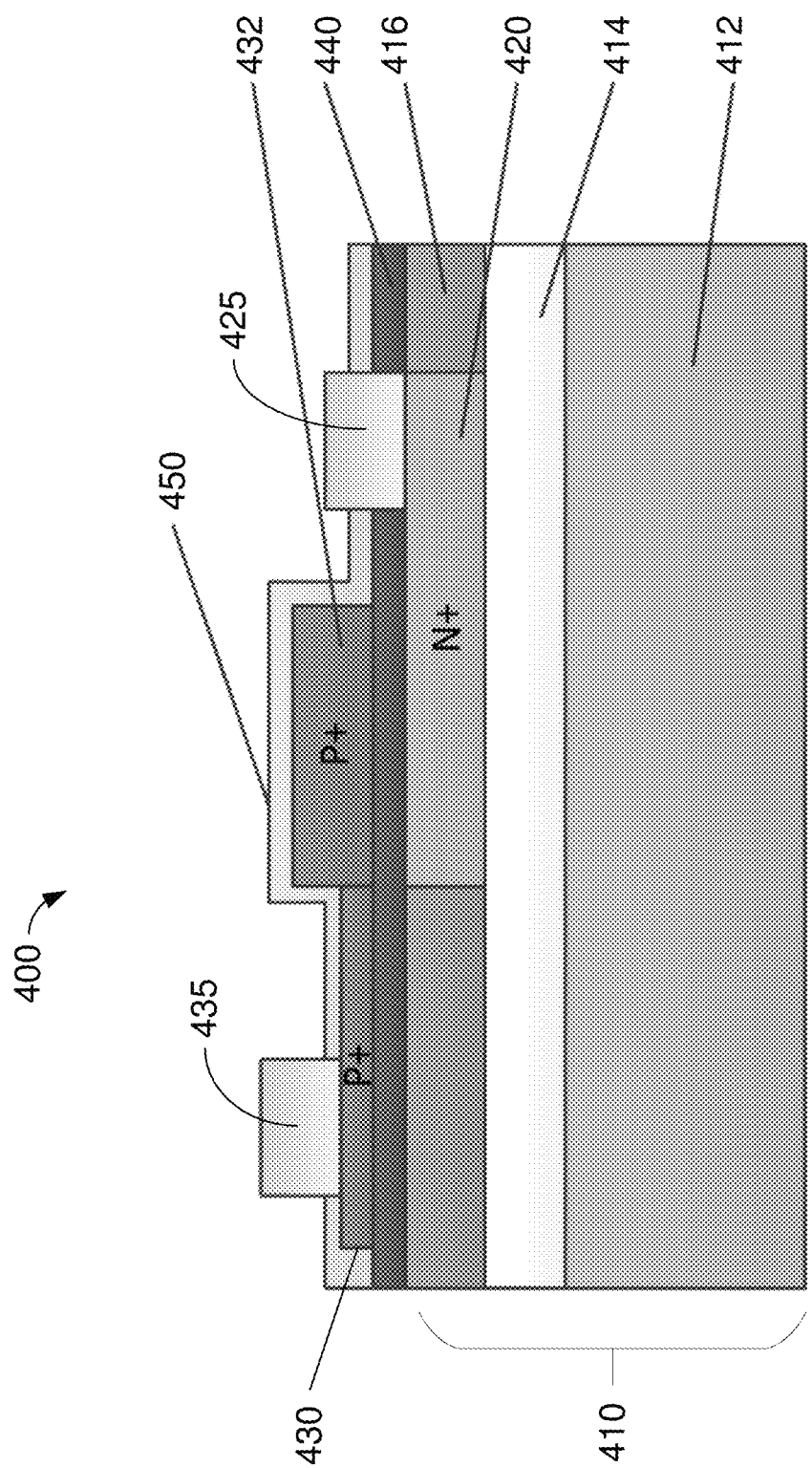
FIG. 4 is a cross-sectional view of an electro-optic structure of a silicon-based rib-waveguide modulator in accordance with another embodiment of the present disclosure.

FIG. 4 illustrates a cross-sectional view of an electro-optic structure of a silicon-based rib-waveguide modulator 400 in accordance with another embodiment of the present disclosure. Silicon-based rib-waveguide modulator 400 may be implemented in an electro-optic device.

Referring to FIG. 4, silicon-based rib-waveguide modulator 400 may include a first top silicon region 420, a second top silicon region 430, a thick dielectric layer 416, and a thin dielectric gate layer 440. The first top silicon region 420 may be at least partially doped to exhibit electrical conductivity of a first type, e.g., N type. For example, the first top silicon layer 420 may be an N+ region. The thick dielectric layer 416 may have a thickness approximately identical to a thickness of the first top silicon region 420, and the thick dielectric layer 416 may fill any remaining space of a plane where the first top silicon region 420 is disposed. The second top silicon region 430 may be at least partially doped to exhibit electrical conductivity of a second type, e.g., P type. For example, the second top silicon layer 430 may be a P+ region. The second top silicon region 430 may be at least in part directly over the first top silicon region 420. The thin dielectric gate layer 440 may be disposed between the first top silicon region 420 and the second top silicon region 430. The thin dielectric gate layer 440 may include a first side in contact with the first top silicon region 420 and a second side in contact with the second top silicon region 430. Silicon-based rib-waveguide modulator 400 may also include a rib waveguide (not shown) formed on the second top silicon region 430, a first electric contact 425 formed on the first top silicon region 420, and a second electric contact 435 formed on the second top silicon region 430. Silicon-based rib-waveguide modulator 400 may further include a passivation layer 450 formed on the second top silicon region 430.

In operation, when electric signals are applied on the first and second electric contacts 425 and 435, free carriers in the silicon-based rib-waveguide modulator 400 may accumulate, deplete, or invert within the first and second top silicon regions 420 and 430 on the first and second sides of the thin dielectric gate layer 440 simultaneously. Additionally, a refractive index of the rib waveguide confining optical field may be modulated. That is, the phase of a guiding light may be modulated.

In some embodiments, at least one of the first top silicon region 420 and the second top silicon region 430 may be made of single-crystal silicon.

Figure 5:
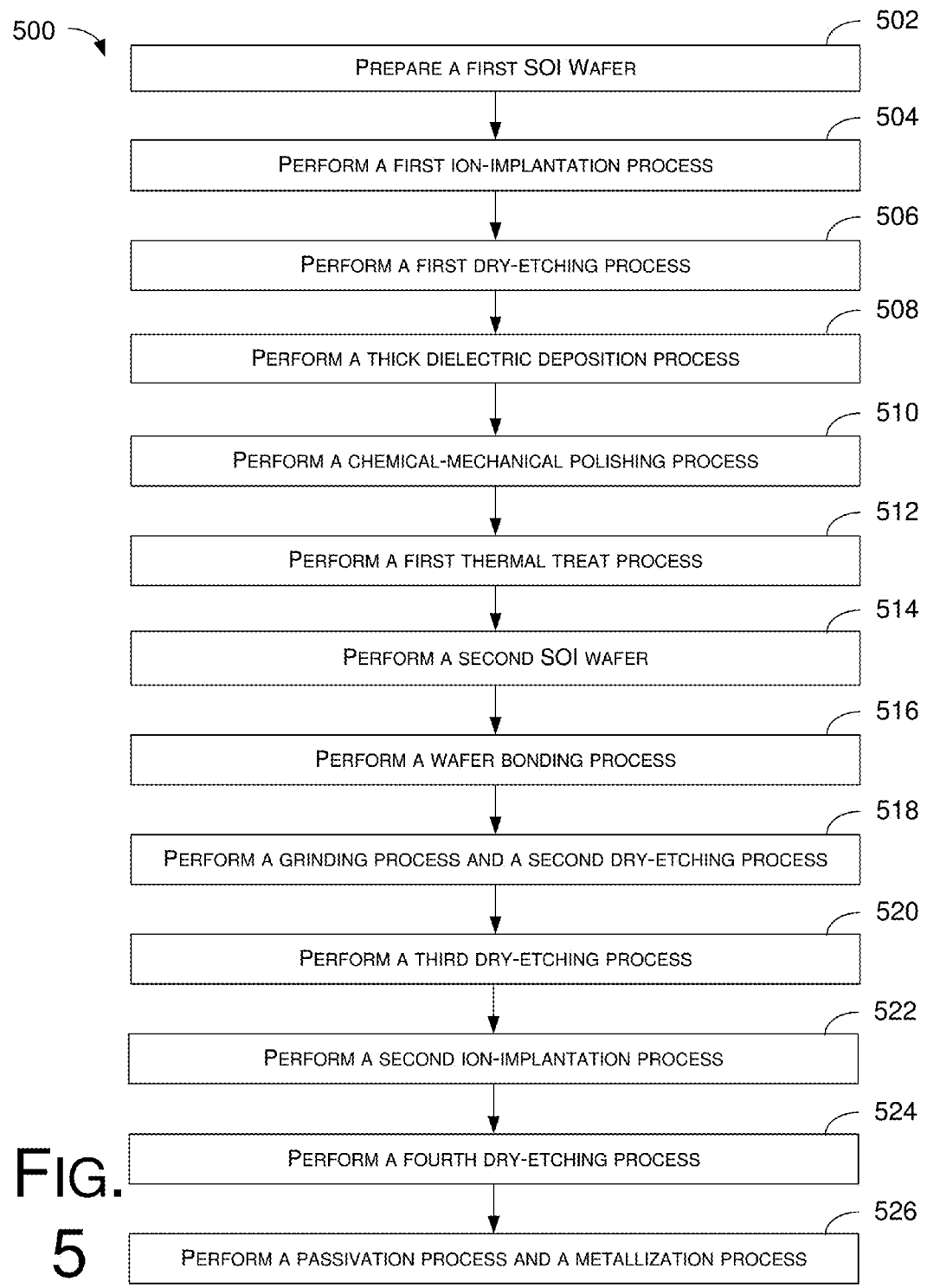
FIG. 5 is a flowchart of a fabrication process of an electro-optic device in accordance with an embodiment of the present disclosure.

FIG. 5 is a flowchart of a process 500 of fabrication of an electro-optic device of FIG. 4 in accordance with an embodiment of the present disclosure.

Process 500 may be utilized to fabricate the silicon-based rib-waveguide modulator 400 of an electro-optic device of FIG. 4. Process 500 may include a number of operations including, but not limited to, those shown in FIG. 5. Although operations 502-526 in FIG. 5 are shown in a particular order, in various embodiments some of the operations 502-526 may be implemented in orders different from that shown in FIG. 5. Moreover, some of the operations 502-526 may be implemented in parallel and not necessarily in series as shown in FIG. 5. For illustrative purpose, the following description of process 500 refers to silicon-based rib-waveguide modulator 400 of FIG. 4.

At 502, process 500 may involve preparing a first SOI wafer 410 that includes a first silicon substrate 412, a first BOX layer 414, and a first top silicon layer (not shown) which is formed over the first BOX layer 414.

At 504, process 500 may involve performing a first ion-implantation process to form a first doped region in the first top silicon layer. The first doped region may be at least partially doped to exhibit electrical conductivity of a first type, e.g., N type.

At 506, process 500 may involve performing a first dry-etching process to etch parts of the first top silicon layer down to the first BOX layer 414 to form a first top silicon region 420 with at least a portion of the first doped region preserved.

At 508, process 500 may involve performing a thick dielectric deposition process to form a thick dielectric layer 416 with a thickness sufficient to entirely cover the first top silicon region 420.

At 510, process 500 may involve performing a CMP process to planarize the thick dielectric layer 416 to remove a part of the thick dielectric layer 416 that is above the first top silicon region 420.

At 512, process 500 may involve performing a first thermal treat process to form a first thin thermal oxidized dielectric layer 440 over the first top silicon region 420.

At 514, process 500 may involve preparing a second SOI wafer (not shown) that includes a second silicon substrate (not shown), a second BOX layer (not shown), and a second top silicon region 430 which is formed over the second BOX layer.

At 516, process 500 may involve performing a wafer bonding process to combine the first SOI wafer 410 and the second SOI wafer with the second top silicon region 430 bonded face-to-face to the thin dielectric layer 440.

At 518, process 500 may involve performing a grinding process and a second dry-etching process to remove the second substrate layer of the second SOI wafer, using the second BOX layer as a stop layer for the second dry-etching process.

At 520, process 500 may involve performing a third dry-etching process to remove the second BOX layer, using the second top silicon region 430 as a stop layer for the third dry-etching process.

At 522, process 500 may involve performing a second ion-implantation process to form a second doped region 432 in the second top silicon region 430. The second doped region 432 may be at least partially doped to exhibit electrical conductivity of a second type, e.g., P type. The second doped region 432 may be at least in part directly over the first doped region of the first top silicon region 420.

At 524, process 500 may involve performing a fourth dry-etch process to form a rib waveguide (not shown) on the second top silicon region 430.

At 526, process 500 may involve performing a passivation process and a metallization process to form a first electric contact 425 on the first top silicon region 420 and a second electric contact 435 formed on the second top silicon region 430.

In at least some embodiments, process 500 may also involve performing a second thermal treat process on the second SOI wafer to form a second thin dielectric layer over the second top silicon layer. Process 500 may further involve performing a wafer bonding process to combine the first SOI wafer and the second SOI wafer, with the second thin dielectric layer bonded face-to-face to the first thin dielectric layer.

Figure 6:
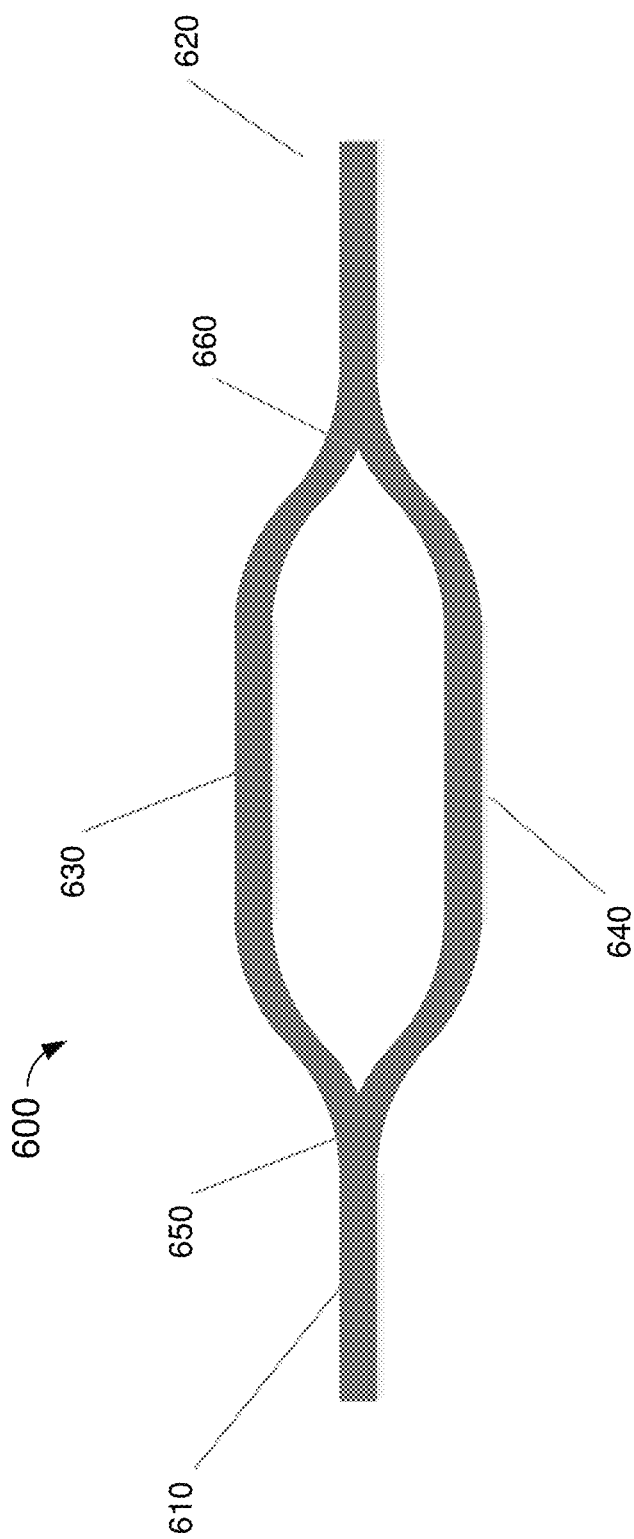
FIG. 6 is a schematic diagram of a Mach-Zehnder interferometer in accordance with an embodiment of the present disclosure.

FIG. 6 illustrates a Mach-Zehnder interferometer 600 in accordance with an embodiment of the present disclosure.

Referring to FIG. 6, Mach-Zehnder interferometer 600 may include an input optical waveguide splitter having an input waveguide part 610 and a splitter 650. Mach-Zehnder interferometer 600 may also include an output optical waveguide combiner having an output waveguide part 620 and a combiner 660. The input optical waveguide splitter may include a first arm 630 and a second arm 640 which are positioned in parallel. The input waveguide part 610 may be optically coupled to the first arm 630 and the second arm 640. The output waveguide part 620 may be optically coupled to the first arm 630 and the second arm 640 of the input optical waveguide splitter. The first arm 630 of the input optical waveguide splitter may include a first electro-optic phase modulator, e.g., silicon-based rib-waveguide modulator 100 or silicon-based rib-waveguide modulator 400 as described above. The first electro-optic phase modulator may include a first top silicon layer, a second top silicon layer, and a thin dielectric gate layer disposed between the first top silicon layer and the second top silicon layer. The first top silicon layer may be at least partially doped to exhibit electrical conductivity of a first type. The second top silicon layer may be at least partially doped to exhibit electrical conductivity of a second type. A doped region of the second top silicon layer may be at least in part directly over a doped region of the first top silicon layer. The first electro-optic phase modulator may also include a rib waveguide formed on the second top silicon layer, a first electric contact formed on the first top silicon layer, and a second electric contact formed on the second top silicon layer. When electric signals are applied on the first and second electric contacts, free carriers in the first electro-optic phase modulator may accumulate, deplete, or invert within the first and second top silicon layers on the first and second sides of the thin dielectric gate layer simultaneously. Moreover, a refractive index of the rib waveguide confining optical field may be modulated. That is, the phase of a guiding light may be modulated.

In some embodiments, at least one of the first top silicon layer and the second top silicon layer may be made of single-crystal silicon.

In some embodiments, the second arm 640 of the input optical waveguide splitter may include a second electro-optic phase modulator, e.g., silicon-based rib-waveguide modulator 100 or silicon-based rib-waveguide modulator 400 as described above. The second electro-optic phase modulator may include a first single-crystal top silicon layer, a second single-crystal top silicon layer, and a thin dielectric gate layer. The first single-crystal top silicon layer may be at least partially doped to exhibit electrical conductivity of the first type. The second single-crystal top silicon layer may be at least partially doped to exhibit electrical conductivity of the second type. A doped region of the second top silicon layer may be at least in part directly over a doped region of the first top silicon layer. The thin dielectric gate layer may be disposed between the first top silicon layer and the second top silicon layer. The second electro-optic phase modulator may also include a rib waveguide formed on the second top silicon layer, a first electric contact formed on the first top silicon layer, and a second electric contact formed on the second top silicon layer. When electric signals are applied on the first and second electric contacts of the second electro-optic phase modulator, free carriers in the second electro-optic phase modulator may accumulate, deplete, or invert within the first and second top silicon layers on the first and second sides of the thin dielectric gate layer simultaneously. Additionally, a refractive index of the rib waveguide confining optical field may be modulated. That is, the phase of the guiding light may be modulated.

Figure 7:
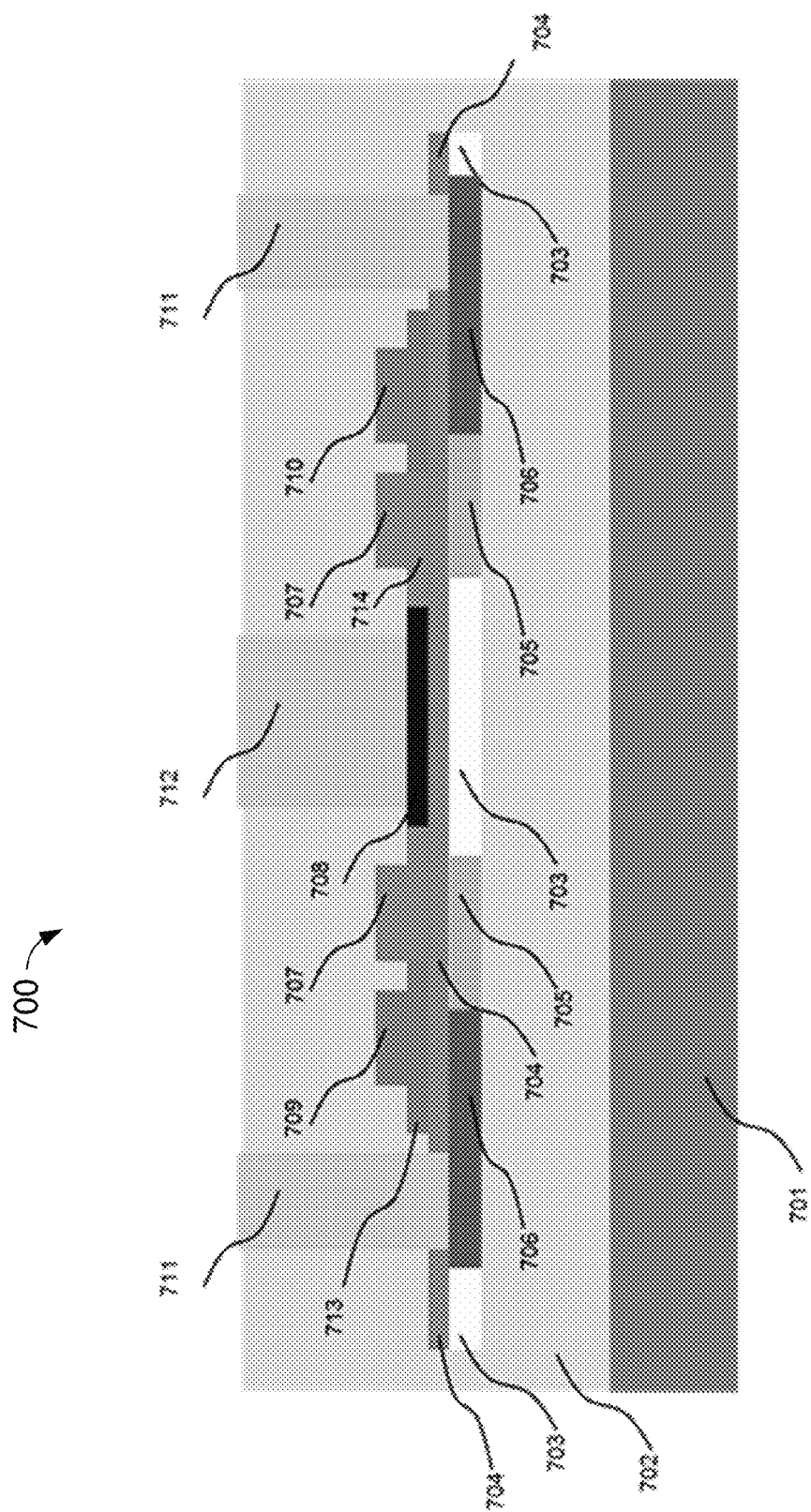
FIG. 7 is a cross-sectional view of a ring modulator formed on a SOI wafer with multiple top silicon layers in accordance with an embodiment of the present disclosure.
Figure 8:
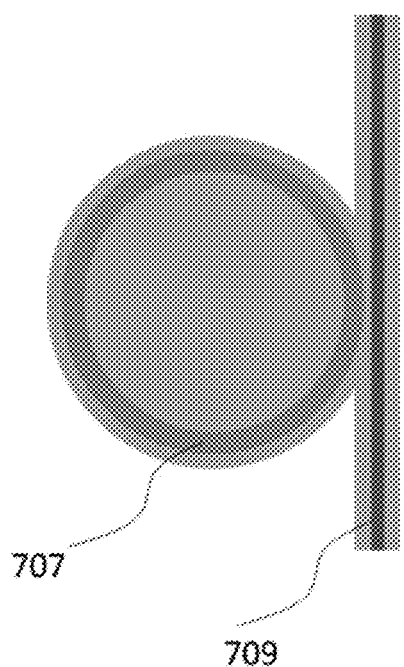
FIG. 8 is a top view of a ring modulator formed on a SOI wafer with multiple top silicon layers in accordance with an embodiment of the present disclosure.
Figure 9:
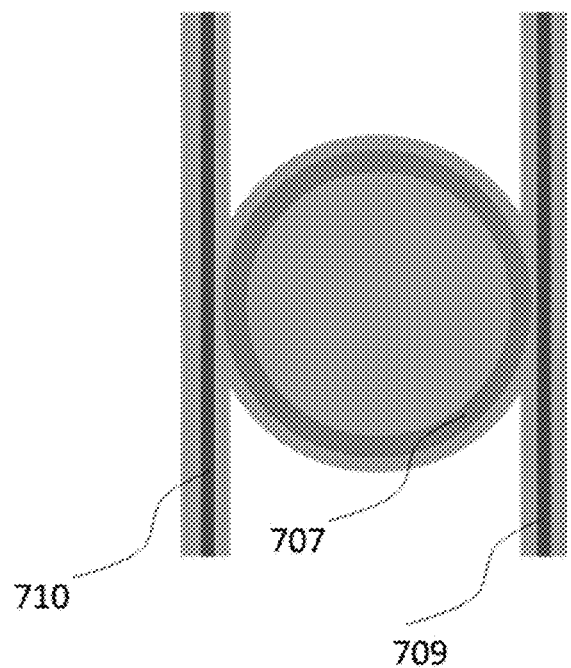
FIG. 9 is a top view of a ring modulator formed on a SOI wafer with multiple top silicon layers in accordance with another embodiment of the present disclosure.
Figure 10:
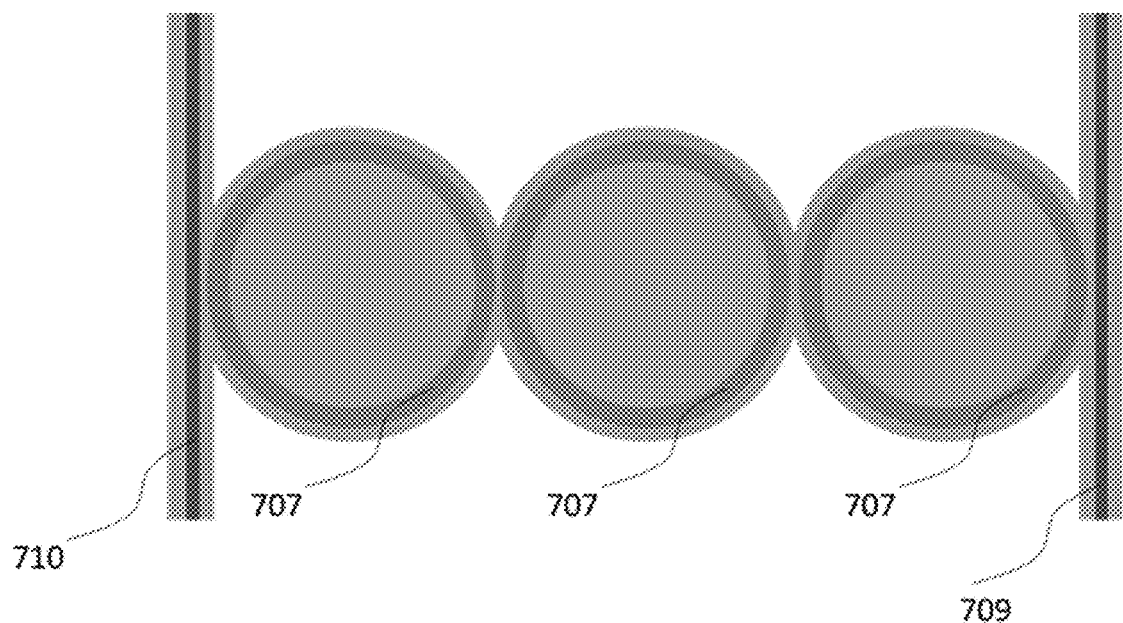
FIG. 10 is a top view of a ring resonance modulator with cascaded ring structure formed on a SOI wafer with multiple top silicon layers in accordance with an embodiment of the present disclosure.

FIG. 7 illustrates a cross-sectional view of a ring modulator 700 formed on a SOI wafer with multiple top silicon layers in accordance with an embodiment of the present disclosure. FIG. 8 is a top view of ring modulator 700 in accordance with an embodiment of the present disclosure. FIG. 9 is a top view of ring modulator 700 in accordance with another embodiment of the present disclosure. FIG. 10 is a top view of a ring resonance modulator with cascaded ring structure formed on a SOI wafer with multiple top silicon layers in accordance with another embodiment of the present disclosure.

Referring to FIG. 7, an optical ring modulator 700 may include a silicon-based rib-waveguide ring modulator. The silicon-based rib-type ring waveguide modulator may include a silicon-on-insulator (SOI) substrate having multiple top silicon layers, such as at least a first top silicon layer and a second top silicon layer, and a thin dielectric layer disposed between the first top silicon layer and the second top silicon layer. The silicon-based rib-type ring waveguide modulator may also include a silicon-based ring resonator formed on the SOI substrate. The silicon-based ring resonator may include a first silicon waveguide part 703 formed on the first top silicon layer, a second silicon waveguide part 713 formed on the second top silicon layer, a thin dielectric gate part 704 formed on the thin dielectric layer, disposed between the first silicon waveguide part 703 and the second silicon waveguide part 713, a first electric contact 711 formed on the first silicon waveguide part 703, and a second electric contact 712 formed on the second silicon waveguide part 713. The thin dielectric layer 704 may include a first side in contact with the first silicon waveguide part 703, and a second side in contact with the second silicon waveguide part 713. The silicon-based ring resonator may include a first rib-type waveguide 709 formed on a second silicon waveguide part 713 and a ring shape rib-type waveguide 707 formed on the second silicon waveguide part 713. When one or more electric signals are applied on the first electric contact 711 and second electric contact 712, free carriers may accumulate, deplete or invert within the first silicon waveguide part 703 and the second silicon waveguide part 713 on the first and second sides of the thin dielectric gate layer 704 beneath the ring-shape rib-type waveguide region, simultaneously, and a refractive index of the ring-shape rib-type waveguide 707 confining optical fields may be modulated.

In some embodiments, the silicon-based ring resonator may also include a second rib-type waveguide 710 formed on the second silicon waveguide part 713.

In some embodiments, at least one of the first top silicon layer and second top silicon layer may be composed of single crystal silicon.

In some embodiments, a first doped region 705 may be formed on the first silicon waveguide part 703. The first doped region 705 may be doped with dopants of a first type.

In some embodiments, a second doped region 706 may be formed within the first doped region 705 on the first silicon waveguide part 703. The second doped region 706 may be doped with dopants of the first type with a dopant concentration higher than that of the first doped region 705.

In some embodiments, the first rib-type waveguide 709 may be composed of intrinsic silicon.

In some embodiments, the second rib-type waveguide 710 may be composed of intrinsic silicon.

In some embodiments, a portion of the second doped region 706 may be beneath the first rib-type waveguide 709 and the second rib-type waveguide 710.

In some embodiments, a third doped region 714 may be formed in the ring-shape rib-type waveguide 707. The third doped region 714 may be doped with dopants of a second type. In some embodiments, dopants of the first type may be n-type dopants, and dopants of the second type may be p-type dopants. Alternatively, dopants of the first type may be p-type dopants, and dopants of the second type may be n-type dopants.

In some embodiments, the first doped region 705 may overlap with the ring-shape rib-type waveguide 707 and the third doped region 714, thereby forming a metal-oxide-semiconductor (MOS) type junction.

In some embodiments, a fourth doped region 708 may be formed on a center slab region within the third doped region 714 of the ring-shape rib-type waveguide 707. The fourth doped region 708 may be doped with dopants of the second type having a dopant concentration higher than that of the third doped region 714.

In some embodiments, the first electric contact 711 may be formed on the second doped region 706 on the first silicon waveguide part 703.

In some embodiments, the second electric contact 712 may be formed on the fourth doped region 708 on the second silicon waveguide part 713.

In some embodiments, the first rib-type waveguide 709 may be disposed next to the ring-shape rib-type waveguide 707 with a small gap between the first rib-type waveguide 709 and the ring-shape rib-type waveguide 707, thereby forming a directional coupler.

In some embodiments, the second rib-type waveguide 710 may be disposed next to the ring-shape rib-type waveguide 707 with a small gap between the second rib-type waveguide 710 and the ring-shape rib-type waveguide 707, thereby forming a directional coupler.

In some embodiments, the ring-shape rib-type waveguide 707 may include a series of cascaded ring-shape rib-type waveguides, thereby forming a cascaded resonance cavity, as shown in FIG. 10.

Figure 11:
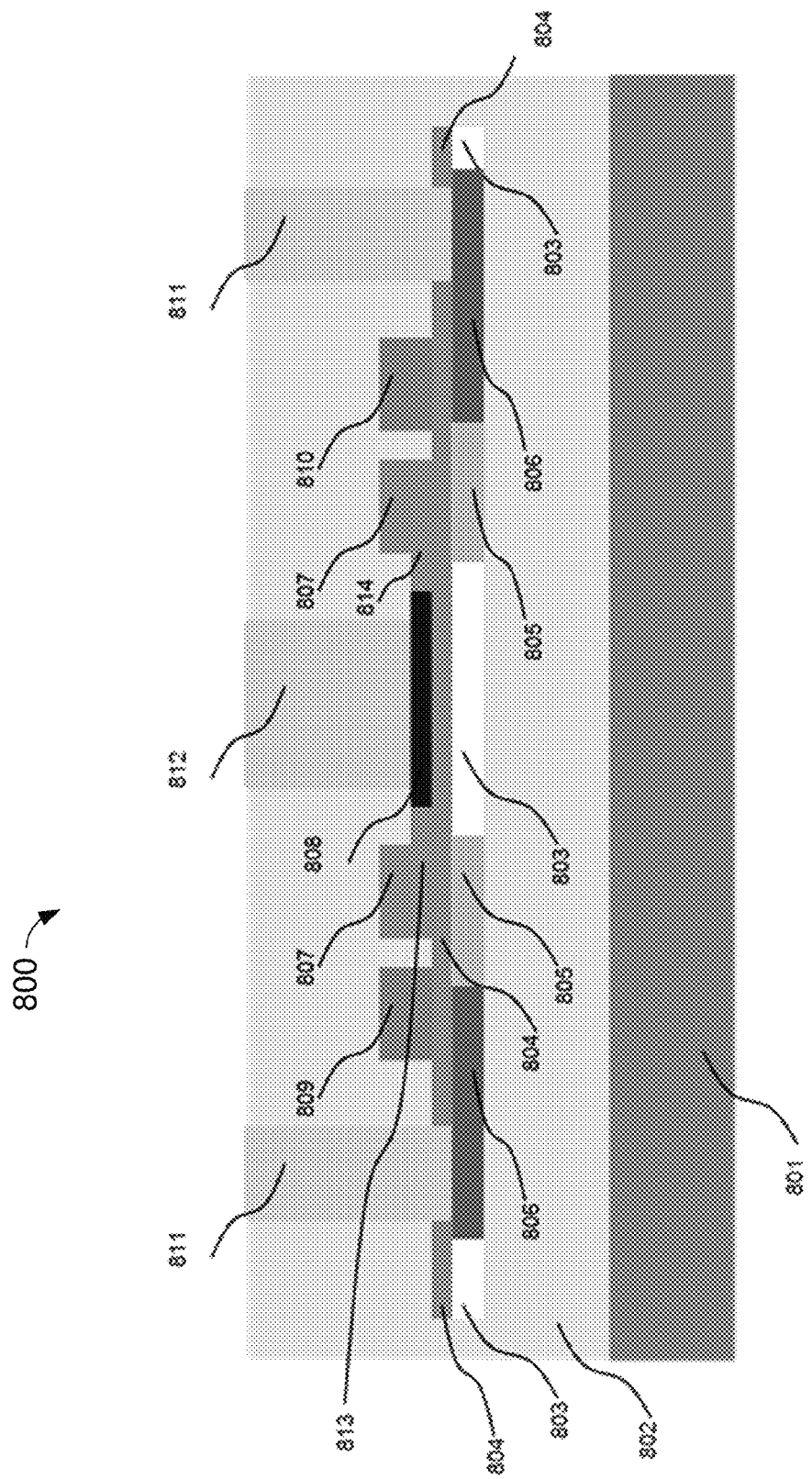
FIG. 11 is a cross-sectional view of a ring modulator formed on a SOI wafer with multiple top silicon layers in accordance with an embodiment of the present disclosure.

FIG. 11 is a cross-sectional view of a ring modulator 800 formed on a SOI wafer with multiple top silicon layers in accordance with an embodiment of the present disclosure.

Referring to FIG. 11, an optical ring modulator may include a silicon-based rib-type waveguide ring modulator 800. The silicon-based rib-type waveguide ring modulator may include a SOI substrate with multiple top silicon layers, such as at least a first top silicon layer and a second top silicon layer, and a thin dielectric layer disposed between the first top silicon layer and the second top silicon layer. The silicon-based rib-type waveguide ring modulator may also include a silicon-based ring resonator, formed on the SOI substrate. The silicon-based ring resonator may include a first silicon waveguide part 803 formed on the first top silicon layer, a second silicon waveguide part 813 formed on the second top silicon layer, a thin dielectric gate part 804 formed on the thin dielectric layer, disposed between the first silicon waveguide part 803 and the second silicon waveguide part 813, a first electric contact 811 formed on the first silicon waveguide part 803 and a second electric contact 812 formed on the second silicon waveguide part 813. The thin dielectric layer 804 may include a first side in contact with the first silicon waveguide part 803, and a second side in contact with the second silicon waveguide part 813. The silicon-based ring resonator may also include a first rib-type waveguide 809 formed on the second silicon waveguide part 813 and a ring shape rib-type waveguide 807 formed on the second silicon waveguide part 813. When one or more electric signals are applied on the first electric contact 811 and second electric contact 812, free carriers may accumulate, deplete or invert within the first silicon waveguide part 803 and the second silicon waveguide part 813 on the first and second sides of the thin dielectric gate layer 804 beneath the ring-shape rib-type waveguide region, simultaneously, and a refractive index of the ring-shape rib-type waveguide 807 confining optical fields may be modulated.

In some embodiments, the silicon-based ring resonator may further include a second rib-type waveguide 810 formed on the second silicon waveguide part 813.

In some embodiments, at least one of the first silicon waveguide part 703 and the second silicon waveguide part 813 may be composed of single crystal silicon.

In some embodiments, a first doped region 805 may be formed on the first silicon waveguide part 803. The first doped region 805 may be doped with dopants of a first type.

In some embodiments, a second doped region 806 may be formed within the first doped region 805 on the first silicon waveguide part 803. The second doped region 806 may be doped with dopants of the first type with a dopant concentration higher than that of the first doped region 805.

In some embodiments, the first rib-type waveguide 809 may be composed of intrinsic silicon.

In some embodiments, the second rib-type waveguide 810 may be composed of intrinsic silicon.

In some embodiments, a portion of the second doped region 806 may be beneath the first rib-type waveguide 809 and the second rib-type waveguide 810.

In some embodiments, a third doped region 814 may be formed in the ring-shape rib-type waveguide 807. The third doped region 814 may be doped with dopants of a second type. In some embodiments, dopants of the first type may be n-type dopants, and dopants of the second type may be p-type dopants. Alternatively, dopants of the first type may be p-type dopants, and dopants of the second type may be n-type dopants.

In some embodiments, the first doped region 805 may overlap with the ring-shape rib-type waveguide 807 and the third doped region 814, thereby forming a MOS type junction.

In some embodiments, a fourth doped region 808 may be formed on a center slab region within the third doped region 814 of the ring-shape rib-type waveguide 807. The fourth doped region 808 may be doped with dopants of the second type with a dopant concentration higher than that of the third doped region 814.

In some embodiments, the first electric contact 811 may be formed on the second doped region 806 on the first silicon waveguide part 803.

In some embodiments, the second electric contact 812 may be formed on the fourth doped region 808 on the second silicon waveguide part 813.

In some embodiments, the first rib-type waveguide 809 may be disposed next to the ring-shape rib-type waveguide 807 with a small gap between the first rib-type waveguide 809 and the ring-shape rib-type waveguide 807, thereby forming a directional coupler.

In some embodiments, the second rib-type waveguide 810 may be disposed next to the ring-shape rib-type waveguide 807 with a small gap between the second rib-type waveguide 810 and the ring-shape rib-type waveguide 807, thereby forming a directional coupler.

In some embodiments, the ring-shape rib-type waveguide 807 may include a series of cascaded ring-shape rib-type waveguides, thereby forming a cascaded resonance cavity.

Figure 12:
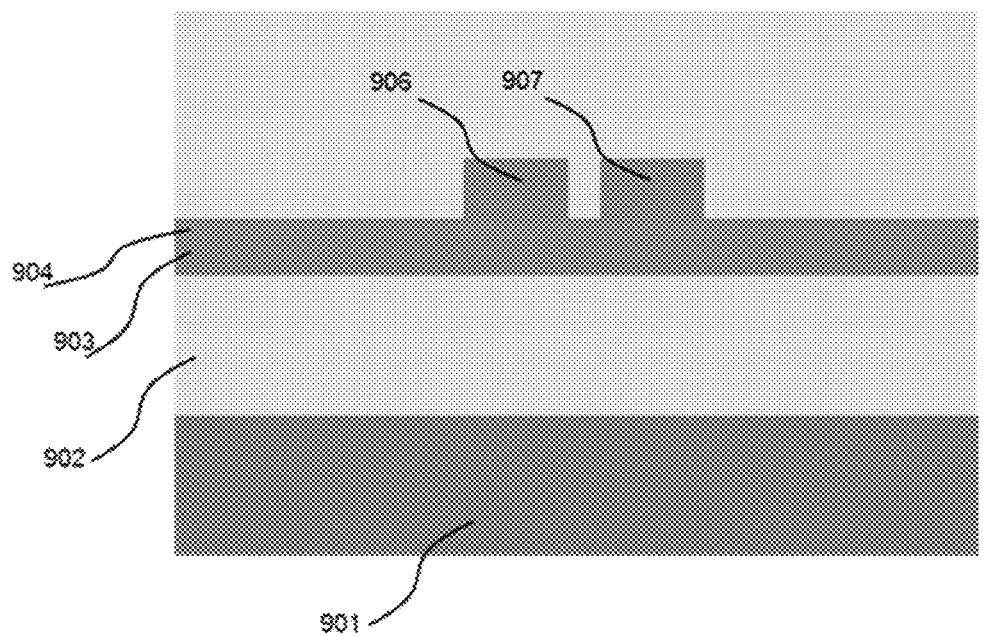
FIG. 12 is a cross-sectional view of a directional coupler formed on a SOI wafer with multiple top silicon layers in accordance with an embodiment of the present disclosure.
Figure 13:
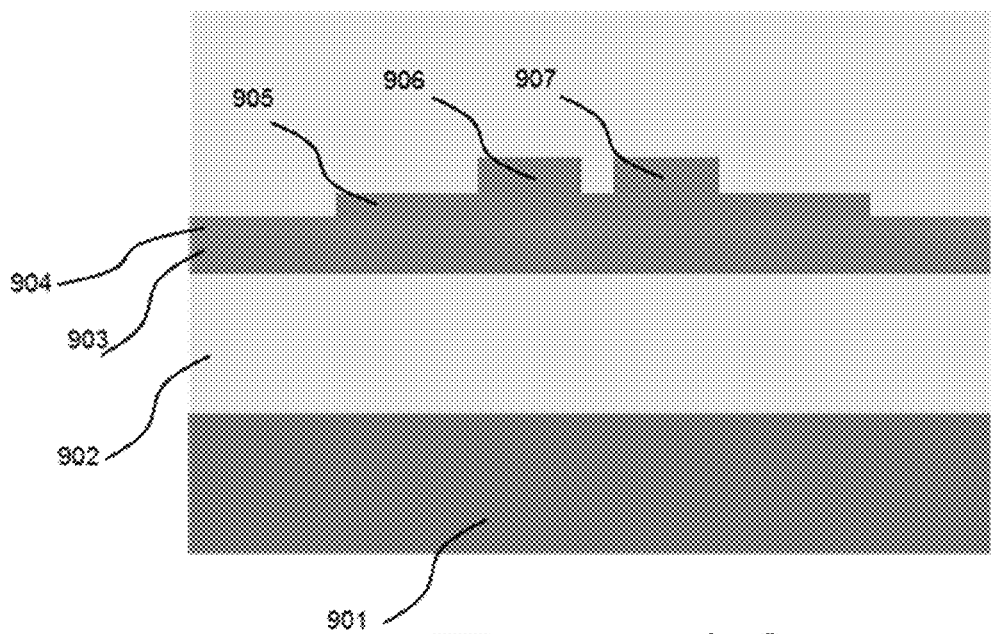
FIG. 13 is cross-sectional view of a directional coupler formed on a SOI wafer with multiple top silicon layers in accordance with an embodiment of the present disclosure.
Figure 14:
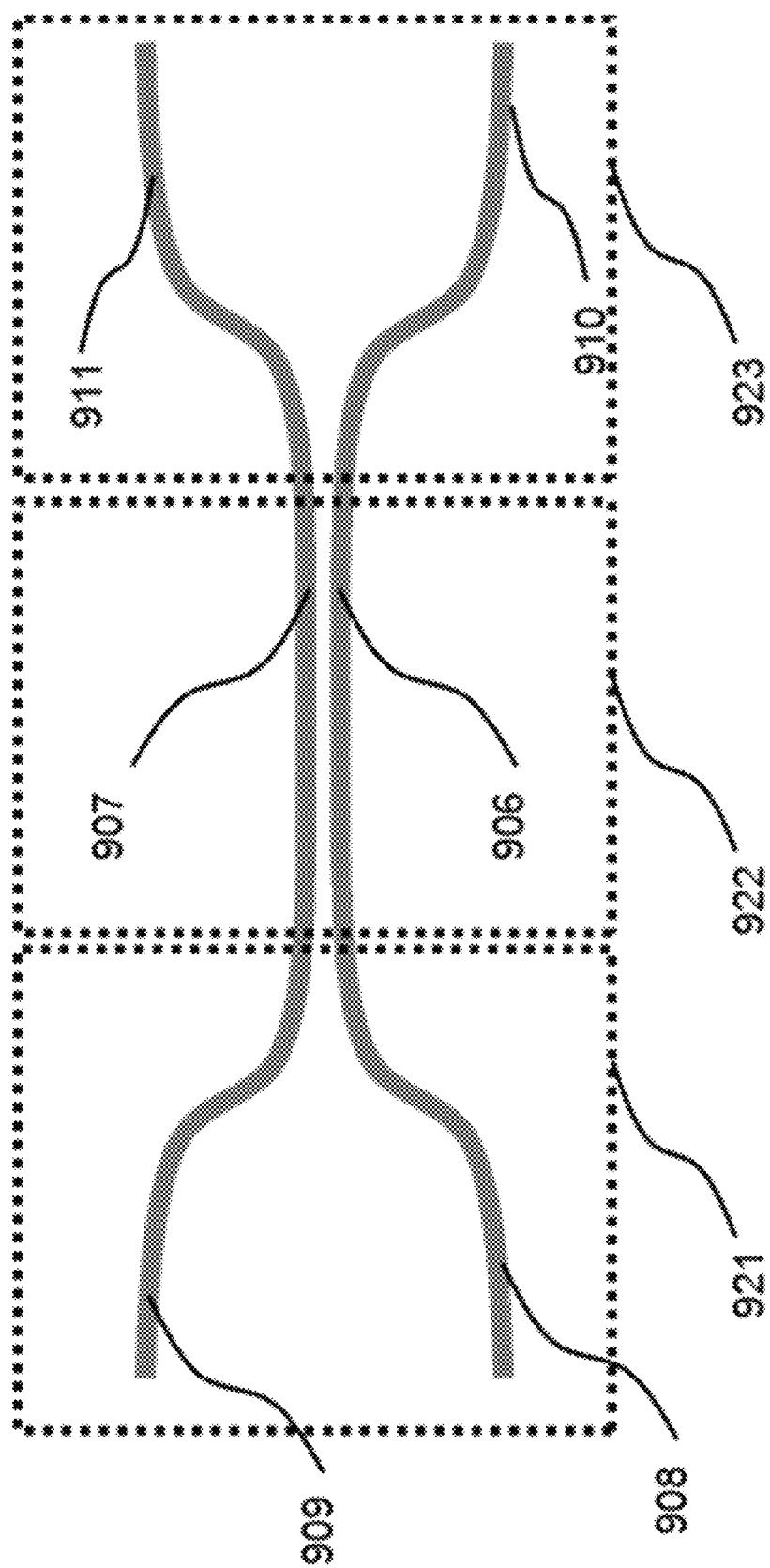
FIG. 14 is a top view of a directional coupler formed on a SOI wafer with multiple top silicon layers in accordance with an embodiment of the present disclosure.

FIG. 12 is a cross-sectional view of directional coupler 900 formed on a SOI wafer with multiple top silicon layers in accordance with another embodiment of the present disclosure. FIG. 13 is cross-sectional view of a directional coupler 900 formed on a SOI wafer with multiple top silicon layers in accordance with another embodiment of the present disclosure. FIG. 14 is a top view of directional coupler 900 formed on a SOI wafer with multiple top silicon layers in accordance with another embodiment of the present disclosure.

Referring to FIGS. 12-14, an optical coupling device may include an input section 921, a directional coupling section 922, and an output section 923. The input section may include a first input rib-type waveguide 908, a second input rib-type waveguide 909, and a continuously decreasing gap between the first input rib-type waveguide 908 and the second input rib-type waveguide 909. The directional coupling section 922 may include a first rib-type coupling waveguide 906, which is connected to the output of the first input rib-type waveguide 908, a second rib-type coupling waveguide 907, which is connected to the output of the second input rib-type waveguide 909, and a small gap between the first rib-type coupling waveguide 906 and the second rib-type coupling waveguide 907. The output section 923 may include a first output rib-type waveguide 910, which is connected to the first rib-type coupling waveguide 906, a second output rib-type waveguide 911, which is connected to the second rib-type coupling waveguide 907, and a continuously increasing gap between the first output rib-type waveguide 906 and the second output rib-type waveguide 907. A slab of each of the first input rib-type waveguide 908, the second input rib-type waveguide 909, the first rib-type coupling waveguide 906, the second rib-type coupling waveguide 907, the first output rib-type waveguide 910, and the second output rib-type waveguide 911 may be formed on a first top silicon layer 903, as demonstrated in FIGS. 12 and 13. A rib of the first input rib-type waveguide 908, the second input rib-type waveguide 909, the first rib-type coupling waveguide 906, the second rib-type coupling waveguide 907, the first output rib-type waveguide 910, and the second output rib-type waveguide 911 may be formed on a second top silicon layer 905. A thin dielectric gate layer 904 may be disposed between the first top silicon layer 903 and the second top silicon layer 905, as demonstrated in FIGS. 12 and 13.

Figure 15:
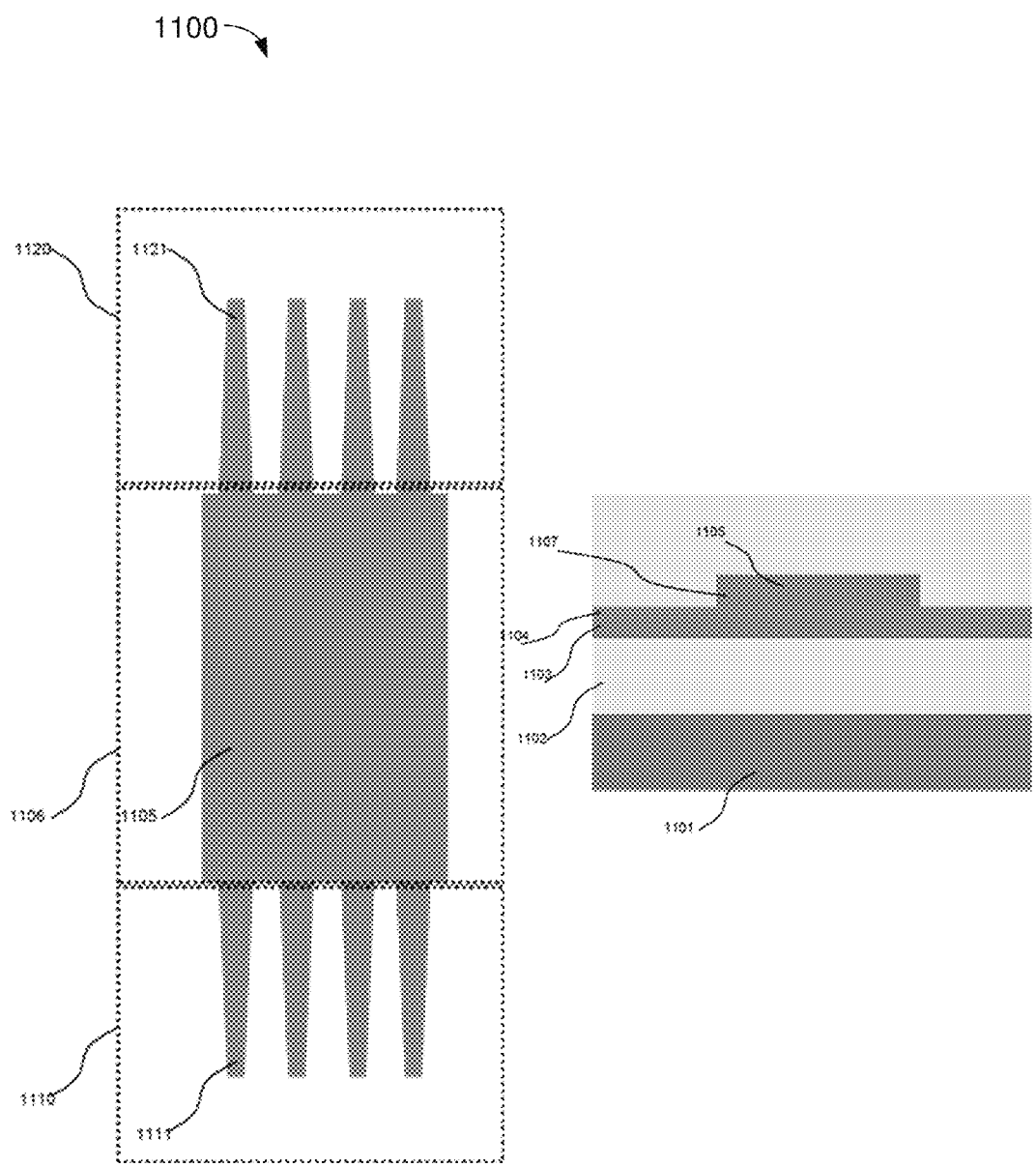
FIG. 15 shows a top view of a multimode interferometer (MMI) waveguide and a cross-sectional view of the MMI waveguide formed on a SOI wafer with multiple top silicon layers in accordance with an embodiment of the present disclosure.

FIG. 15 shows various views of a multimode interferometer (MMI) coupler apparatus 1100, including a top view of a MMI waveguide and a cross-sectional view of the MMI waveguide formed on a SOI wafer with multiple top silicon layers in accordance with an embodiment of the present disclosure.

Referring to FIG. 15, the MMI coupler apparatus 1100 may include an input section 1110, a rib-type multimode interference waveguide section 1106, and an output section 1120. The input section 1110 may include at least one input rib-type waveguide 1111. The rib-type multimode interference waveguide section 1106 may include a rib-type multimode interference waveguide 1105. The output section 1120 may include at least one output rib-type waveguide 1121. A slab of each of the at least one input rib-type waveguide 1111, the rib-type multimode interference waveguide 1105, and the at least one output rib-type waveguide 1121 may be formed on a first top silicon layer 1103, as demonstrated in FIG. 15. A rib of each of the at least one input rib-type waveguide 1111, the rib-type multimode interference waveguide 1105, and the at least one output rib-type waveguide 1121 may be formed on the second top silicon layer 1107, as demonstrated in FIG. 15. A thin dielectric gate layer may be disposed between the first top silicon layer 1103 and the second top silicon layer 1107.

In some embodiments, the at least one input rib-type waveguide 1111 may include a taper waveguide with an increasing width. Moreover, the at least one output rib-type waveguide 1121 may be a taper waveguide with a decreasing width.

Feature Highlights

In view of the above description and associated figures, a number of innovative features are highlighted below to aid better appreciation of various embodiments in accordance with the present disclosure.

According to one aspect, a ring optical modulator may include a silicon-on-insulator (SOI) substrate and a silicon-based ring resonator. The SOI substrate may include multiple top silicon layers (e.g., at least two top silicon layers, and at least one thin dielectric layer inbetween). The silicon-based ring resonator may be formed on the multiple top silicon layers of the SOI substrate, and may include a first silicon waveguide part formed on the first top silicon layer, a second silicon waveguide part formed on the second top silicon layer, a thin dielectric gate part formed on the thin dielectric layer, a first electric contact, and a second electric contact. The silicon-based ring resonator may also include a first rib-type waveguide formed on the second silicon waveguide part and a ring-shape rib-type waveguide formed on the second silicon waveguide part. The thin dielectric gate layer may be disposed between the first silicon waveguide part and the second silicon waveguide part. The thin dielectric layer may include a first side in contact with the first silicon waveguide part and a second side in contact with the second silicon waveguide part. The first electric contact may be formed on the first silicon waveguide part. The second electric contact may be formed on the second silicon waveguide part. When electric signals are applied on the first and second electric contacts, free carriers may accumulate, deplete or invert within the first and second silicon waveguide parts on the first and second sides of the thin dielectric gate layer beneath the ring-shape rib-type waveguide, simultaneously, and a refractive index of the ring-shape rib-type waveguide confining optical fields may be modulated.

In some embodiments, the silicon-based ring resonator may also include a second rib-type waveguide formed on the second silicon waveguide part.

In some embodiments, either or both of the first and second top silicon layers may be composed of single crystal silicon.

In some embodiments, a first doped region may be formed on the first silicon waveguide part, and may include dopants of a first type. In some embodiments, a second doped region may be formed within the first doped region on the first silicon waveguide part, and the second doped region may include dopants of the first type with a concentration of dopants higher than that of the first doped region.

In some embodiments, the first rib-type waveguide may be composed of intrinsic silicon.

In some embodiments, the second rib-type waveguide may be composed of intrinsic silicon.

In some embodiments, a portion of the second doped region may be beneath the first rib-type waveguide and the second rib-type waveguide.

In some embodiments, a third doped region may be formed in the ring-shape rib-type waveguide, and may include dopants of a second type.

In some embodiments, the first doped region may overlap with the ring-shape rib-type waveguide and the third doped region, forming a metal-oxide-semiconductor (MOS) type junction.

In some embodiments, a fourth doped region may be formed on a center slab region within the third doped region of the ring-shape rib-type waveguide, and may have a concentration of dopants higher than that of the third doped region.

In some embodiments, the first electric contact may be formed on the second doped region on the first silicon waveguide part.

In some embodiments, the second electric contact may be formed on the fourth doped region on the second silicon waveguide part.

In some embodiments, the first rib-type waveguide may be disposed next to the ring-shape rib-type waveguide with a small gap therebetween, forming a directional coupler.

In some embodiments, the second rib-type waveguide may be disposed next to the ring-shape rib-type waveguide with a small gap therebetween, forming a directional coupler.

In some embodiments, the silicon-based ring resonator may further include a second rib-type waveguide formed on the second silicon waveguide part.

In some embodiments, the ring-shape rib-type waveguide may include a series of cascaded ring-shape rib-type waveguides, forming a cascaded resonance cavity.

According to another aspect, an optical coupling device may include an input section, a directional coupling section, and an output section. The input section may include a first input rib-type waveguide, a second input rib-type waveguide, and a continuously decreasing gap between the first input rib-type waveguide and the second input rib-type waveguide. The directional coupling section may include a first rib-type coupling waveguide, a second rib-type coupling waveguide, and a small gap between the first rib-type waveguide and the second rib-type waveguide. The first rib-type coupling waveguide may be connected to an output of the first input rib-type waveguide. The second rib-type coupling waveguide may be connected to an output of the second input rib-type waveguide. The output section may include a first output rib-type waveguide, a second output rib-type waveguide, and a continuously increasing gap between the first output rib-type waveguide and the second output rib-type waveguide. The first output rib-type waveguide may be connected to the first rib-type coupling waveguide. The second output rib-type waveguide may be connected to the second rib-type coupling waveguide. A slab of each of the first input rib-type waveguide, the second input rib-type waveguide, the first rib-type coupling waveguide, the second rib-type coupling waveguide, the first output rib-type waveguide and the second output rib-type waveguide may be formed on a first top silicon layer. A rib of each of the first input rib-type waveguide, the second input rib-type waveguide, the first rib-type coupling waveguide, the second rib-type coupling waveguide, the first output rib-type waveguide and the second output rib-type waveguide may be formed on a second top silicon layer. A thin dielectric gate layer may be disposed between the first top silicon layer and the second top silicon layer.

According to another aspect, an integrated polarization rotator-splitter apparatus may include an input waveguide section, a rib-type waveguide based polarization rotator section, a rib-type waveguide based polarization splitter section, and an outgoing waveguide section. A slab of each of the rib-type waveguide based polarization rotator section and the slab of the rib-type waveguide based polarization splitter section may be formed on a first top silicon layer. A rib of the rib-type waveguide based polarization rotator section and a slab of the rib-type waveguide based polarization splitter section may be formed on a second top silicon layer. A thin dielectric gate layer may be disposed between the first top silicon layer and the second top silicon layer.

In some embodiments, the input waveguide section may include a channel-type waveguide configured to receive an optical signal with TE0-polarized and TM0-polarized modes.

In some embodiments, the polarization rotator section may include a taper rib-type waveguide. The taper rib-type waveguide may include a first part and a second part. The first part may include a tapered slab on each side of the rib-type waveguide, with each tapered slab configured to adiabatically couple an optical signal from channel modes to rib modes. The second part may include a tapered rib with larger width on an output side, with each tapered rib configured to rotate a TM0-polarized component of the respective optical signal to a higher-order mode, TEn, of the rib-type waveguide and to output the TEn mode to the polarization splitter section. The variable n is greater than or equal to 1. The TE0-polarized component may propagate without loss and may be provided to the polarization splitter section.

In some embodiments, the polarization splitter section may include a rib-type asymmetric directional coupler. The rib-type asymmetric directional coupler may include a first branch and a second branch. The first branch may be connected to an output port of the polarization rotator section, and may be configured to propagate a TE0 component to the output port without loss. The second branch may be disposed in parallel with the first branch. A rib width of the second branch may be configured to match a TE0 mode thereof to a higher-order mode, TEn, in the first branch such that a TEn component from the first branch is coupled to the second branch.

In some embodiments, the outgoing waveguide section may include two output waveguides separated by an increasing-width gap. The two output waveguides may include a first output waveguide and a second output waveguide. The first output waveguide may include an input port connected to a first branch of a rib-type asymmetric directional coupler. The second output waveguide may include an input port connected to a second branch of the rib-type asymmetric directional coupler. The outgoing waveguide section may also include a gap with an increasing width between the two output waveguides, with the gap configured to suppress optical coupling between the two output waveguides.

In some embodiments, either or both of the first top silicon layer and the second top silicon layer may be composed of crystal silicon. The first top silicon layer and the second top silicon layer may be disposed on a buried oxide layer (BOX) and a thick silicon substrate, forming a multiple top layer silicon-on-insulator substrate.

In some embodiments, the input waveguide section may include a rib-type waveguide.

In some embodiments, the higher-order mode may be TE1 mode.

In some embodiments, a width profile of the tapered slab of the first part of the tapered-slab rib-type waveguide may have a linearly tapered profile, an exponentially tapered profile, a quadratically tapered profile, or a combination of some or all of above-listed tapered profiles.

In some embodiments, a width profile of the tapered rib of the second part of the tapered-rib rib-type waveguide may have a linearly tapered profile, an exponentially tapered profile, a quadratically tapered profile, or a combination of some or all of above-listed tapered profiles.

In some embodiments, an efficiency of polarization conversion from a TM0 mode to the TEn mode may be higher near a center of the second part of the taper rib-type waveguide, and may be lower near an end of the second part of the taper rib-type waveguide such that a tapered-rib configuration of the taper rib-type waveguide is more tolerant to a fabrication process.

In some embodiments, the first branch of the asymmetric directional coupler may be a straight rib type waveguide.

In some embodiments, the first branch of the asymmetric directional coupler may include a tapered-rib type waveguide with an increasing width or a tapered-rib type waveguide with a decreasing width.

In some embodiments, the rib of the second branch may be a tapered rib with a width profile having a linearly tapered profile, an exponentially tapered profile, a quadratically tapered profile, or a combination of some or all of above-listed tapered profiles.

In some embodiments, an efficiency of adiabatically coupling from the TEn mode in the first branch to the TE0 mode in the second branch may be higher near a center of the rib-type asymmetric directional coupler, and may be lower near an end of the rib-type asymmetric directional coupler such that a tapered-rib configuration of the rib-type asymmetric directional coupler is more tolerant to a fabrication process.

In some embodiments, the slab of the first output waveguide may be configured to be taper-like to gradually couple the TE0-polarized rib-mode signal to TE0-polarized channel-mode.

In some embodiments, the slab of the second output waveguide may be configured to be taper-like to gradually couple a TE0-polarized rib-mode signal to a TE0-polarized channel-mode.

In some embodiments, the outgoing waveguide section may further include a TM-mode filter and a TE1 mode filter.

In some embodiments, the TM-mode filter may include a series of bending-waveguide with a small radius of several microns.

In some embodiments, the TE1 mode filter may include a channel waveguide or a rib-type waveguide with a predetermined waveguide width configured to support TE0-mode and TM0-mode propagation.

According to another aspect, a multimode interference (MMI) waveguide apparatus may include an input section, a rib-type multimode interference waveguide, and an output section. The input section may include at least one input rib-type waveguide. The output section may include at least one output rib-type waveguide. A slab of each of the at least one input rib-type waveguide, the rib-type multimode interference waveguide, and the at least one output rib-type waveguide may be formed on the first top silicon layer. A rib of each of the at least one input rib-type waveguide, the rib-type multimode interference waveguide, and the at least one output rib-type waveguide may be formed on the second top silicon layer. A thin dielectric gate layer may be disposed between the first top silicon layer and the second top silicon layer.

In some embodiments, the at least one input rib-type waveguide may be a taper waveguide with an increasing width.

In some embodiments, the at least one output rib-type waveguide may be a taper waveguide with a decreasing width.

ADDITIONAL NOTES

Although some embodiments are disclosed above, they are not intended to limit the scope of the present disclosure. It will be apparent to those skilled in the art that various modifications and variations can be made to the disclosed embodiments of the present disclosure without departing from the scope or spirit of the present disclosure. In view of the foregoing, the scope of the present disclosure shall be defined by the following claims and their equivalents.

What is claimed is:

1. A ring optical modulator, comprising:
a silicon-on-insulator (SOI) substrate comprising multiple top silicon layers having at least a first top silicon layer and a second top silicon layer, the SOI substrate further comprising a thin dielectric layer disposed between the first top silicon layer and the second top silicon layer; and
a silicon-based ring resonator formed on the SOI substrate, comprising:
a first silicon waveguide part formed on the first top silicon layer;
a second silicon waveguide part formed on the second top silicon layer;
a thin dielectric gate part formed on the thin dielectric layer and disposed between the first silicon waveguide part and the second silicon waveguide part, the thin dielectric layer comprising a first side in contact with the first silicon waveguide part and a second side in contact with the second silicon waveguide part;

a first electric contact formed on the first silicon waveguide part;
a second electric contact formed on the second silicon waveguide part;
a first rib-type straight waveguide formed on the second silicon waveguide part; and
a ring-shape rib-type waveguide formed on the second silicon waveguide part,
wherein, when one or more electric signals are applied on the first and second electric contacts, free carriers accumulate, deplete or invert within the first and second silicon waveguide parts on the first and second sides of the thin dielectric gate layer beneath the ring-shape rib-type waveguide, simultaneously, and a refractive index of the ring-shape rib-type waveguide confining optical fields is modulated.

2. The ring optical modulator of claim 1, further comprising a second rib-type waveguide formed on the second silicon waveguide part.

3. The ring optical modulator of claim 1, wherein at least one of the first top silicon layer and the second top silicon layer is composed of single crystal silicon.

4. The ring optical modulator of claim 1, further comprising a first doped region formed on the first silicon waveguide part, the first doped region comprising dopants of a first type.

5. The ring optical modulator of claim 4, further comprising a second doped region formed within the first doped region on the first silicon waveguide part, the second doped region comprising dopants of the first type with a concentration of dopants higher than that of the first doped region.

6. The ring optical modulator of claim 1, wherein the first rib-type waveguide is composed of intrinsic silicon.

7. The ring optical modulator of claim 2, wherein the second rib-type waveguide is composed of intrinsic silicon.

8. The ring optical modulator of claim 2, further comprising a second doped region that comprises dopants of a first type, wherein a portion of the second doped region is beneath the first rib-type waveguide and the second rib-type waveguide.

9. The ring optical modulator of claim 5, further comprising a third doped region formed in the ring-shape rib-type waveguide, the third doped region comprising dopants of a second type.

10. The ring optical modulator of claim 9, wherein the first doped region overlaps with the ring-shape rib-type waveguide and the third doped region to form a metal-oxide-semiconductor (MOS) type junction.

11. The ring optical modulator of claim 9, further comprising a fourth doped region formed on a center slab region within the third doped region of the ring-shape rib-type waveguide, the fourth doped region having a concentration of dopants higher than that of the third doped region.

12. The ring optical modulator of claim 11, wherein the first electric contact is formed on the second doped region on the first silicon waveguide part.

13. The ring optical modulator of claim 11, wherein the second electric contact is formed on the fourth doped region on the second silicon waveguide part.

14. The ring optical modulator of claim 1, wherein the first rib-type waveguide is disposed next to the ring-shape rib-type waveguide with a small gap therebetween, forming a directional coupler.

15. The ring optical modulator of claim 2, wherein the second rib-type waveguide is disposed next to the ring-shape rib-type waveguide with a small gap therebetween, forming a directional coupler.

16. The ring optical modulator of claim 1, wherein the ring-shape rib-type waveguide comprises a series of cascaded ring-shape rib-type waveguides, forming a cascaded resonance cavity.

* * * * *